(12) United States Patent
Farr

(10) Patent No.: US 7,347,632 B2
(45) Date of Patent: Mar. 25, 2008

(54) OPTICAL CONNECTORS FOR ELECTRONIC DEVICES

(76) Inventor: Mina Farr, 1119 Webster St., Palo Alto, CA (US) 94301

(*) Notice: Subject to any disclaimer, the term of this patent is extended or adjusted under 35 U.S.C. 154(b) by 0 days.

(21) Appl. No.: 11/009,208

(22) Filed: Dec. 10, 2004

(65) Prior Publication Data

US 2005/0180700 A1    Aug. 18, 2005

Related U.S. Application Data

(60) Provisional application No. 60/634,214, filed on Dec. 8, 2004, provisional application No. 60/529,129, filed on Dec. 12, 2003.

(51) Int. Cl.
*G02B 6/36* (2006.01)

(52) U.S. Cl. .................................... 385/89

(58) Field of Classification Search ............... 385/89
See application file for complete search history.

(56) References Cited

U.S. PATENT DOCUMENTS

| | | | |
|---|---|---|---|
| 4,427,879 A | | 1/1984 | Becher et al. |
| 4,768,188 A | | 8/1988 | Barnhart et al. |
| 4,902,092 A | | 2/1990 | Grandy |
| 5,337,398 A | * | 8/1994 | Benzoni et al. ............ 385/90 |
| 5,497,187 A | | 3/1996 | Banker et al. |
| 5,515,467 A | | 5/1996 | Webb |
| 5,631,988 A | * | 5/1997 | Swirhun et al. ............ 385/89 |
| 5,668,419 A | | 9/1997 | Oktay |
| 5,732,176 A | | 3/1998 | Savage, Jr. |
| 6,036,654 A | | 3/2000 | Quinn et al. |
| 6,179,627 B1 | | 1/2001 | Daly et al. |
| 6,217,231 B1 | * | 4/2001 | Mesaki et al. ............... 385/88 |
| 6,220,873 B1 | | 4/2001 | Samela et al. |
| 6,267,606 B1 | | 7/2001 | Poplawski et al. |
| 6,446,867 B1 | | 9/2002 | Sanchez |
| 6,458,619 B1 | * | 10/2002 | Irissou ..................... 438/66 |
| 6,478,625 B2 | | 11/2002 | Tolmie et al. |
| 6,502,997 B1 | | 1/2003 | Lee et al. |
| 6,515,308 B1 | * | 2/2003 | Kneissl et al. ............. 257/86 |
| 6,588,942 B1 | * | 7/2003 | Weld et al. ................ 385/88 |
| 6,607,307 B2 | | 8/2003 | Gilliland et al. |
| 6,758,693 B2 | | 7/2004 | Inagaki et al. |
| 6,774,348 B2 | | 8/2004 | Tatum et al. |
| 6,793,539 B1 | | 9/2004 | Lee et al. |
| 6,914,637 B1 | | 7/2005 | Wolf et al. |
| 6,941,395 B1 | | 9/2005 | Galang et al. |

(Continued)

OTHER PUBLICATIONS

U.S. Appl. No. 10/829,609 filed Apr. 22, 2004 entitled "Compact Optical Transceivers.".

(Continued)

*Primary Examiner*—Ellen E. Kim

(57) ABSTRACT

A high-data rate connector for use with consumer electronics couples digital electrical connection interfaces with optical cabling and optical transceivers. In one implementation, an electrical connection interface, such as a DVI, HDMI, or USB connection interface is electrically coupled to an optical transceiver. The optical transceiver includes an optical transmitter, such as a VCSEL, and an optical detector, such as a photodiode. The transmit fiber and the receive fiber are each positioned relatively close to the corresponding optical transmitter and optical detector without a lens. The optical transmitter and the optical detector are each optimized for the size of the optical fiber core to enable high throughput speed at relatively low cost.

26 Claims, 4 Drawing Sheets

U.S. PATENT DOCUMENTS

| | | | |
|---|---|---|---|
| 6,952,395 B1 | 10/2005 | Manoharan et al. | |
| 6,965,722 B1 | 11/2005 | Nguyen | |
| 7,065,604 B2* | 6/2006 | Konda et al. | 710/315 |
| 7,088,518 B2 | 8/2006 | Tatum et al. | |
| 7,153,039 B2* | 12/2006 | McGarvey et al. | 385/91 |
| 7,162,130 B2 | 1/2007 | Castellani et al. | |
| 7,217,022 B2 | 5/2007 | Ruffin | |
| 2001/0035994 A1 | 11/2001 | Agazzi et al. | |
| 2002/0044746 A1 | 4/2002 | Kronlund et al. | |
| 2002/0049879 A1* | 4/2002 | Eyer | 710/305 |
| 2002/0063935 A1 | 5/2002 | Price et al. | |
| 2002/0076157 A1* | 6/2002 | Kropp | 385/38 |
| 2002/0114590 A1 | 8/2002 | Eichenberger et al. | |
| 2002/0149821 A1 | 10/2002 | Aronson et al. | |
| 2002/0159725 A1 | 10/2002 | Bucklen | |
| 2002/0160656 A1 | 10/2002 | Nishita | |
| 2003/0016920 A1 | 1/2003 | Sohmura et al. | |
| 2003/0034963 A1* | 2/2003 | Moon et al. | 345/204 |
| 2003/0208779 A1 | 11/2003 | Green et al. | |
| 2003/0223756 A1 | 12/2003 | Tatum et al. | |
| 2004/0076119 A1 | 4/2004 | Aronson et al. | |
| 2004/0184746 A1 | 9/2004 | Chang et al. | |
| 2004/0208600 A1 | 10/2004 | Guenter et al. | |
| 2004/0263941 A1 | 12/2004 | Chen et al. | |
| 2005/0036746 A1 | 2/2005 | Scheibenreif et al. | |
| 2005/0053340 A1 | 3/2005 | Toriumi et al. | |
| 2005/0063707 A1 | 3/2005 | Imai | |
| 2005/0063711 A1 | 3/2005 | Rossi et al. | |
| 2005/0078916 A1 | 4/2005 | Hosking | 385/14 |
| 2005/0105910 A1 | 5/2005 | Light | |
| 2005/0105913 A1* | 5/2005 | Ozeki et al. | 398/140 |
| 2005/0105915 A1 | 5/2005 | Light | 398/135 |
| 2005/0286593 A1 | 12/2005 | Guenter | |
| 2006/0008276 A1 | 1/2006 | Sakai et al. | |
| 2006/0036788 A1* | 2/2006 | Galang et al. | 710/65 |
| 2006/0045437 A1 | 3/2006 | Tatum et al. | |
| 2006/0049936 A1 | 3/2006 | Collins et al. | |
| 2006/0067690 A1* | 3/2006 | Tatum et al. | 398/66 |
| 2006/0077778 A1 | 4/2006 | Tatum et al. | |
| 2006/0088251 A1 | 4/2006 | Wang et al. | |

OTHER PUBLICATIONS

"Sandia Develops Vertical Cavity Surface Emitting Laser that Promises to Reduce Cost of Fiber Optics Connections," Sandia National Laboratories, Jun. 6, 2000, *available at* http://www.sandia.gov/media/NewsRel/NR2000/laser.htm.

Article entitled "Fiber Optic Infrastructure," by Extreme Networks, 2000.

Article entitled "Optical DVI—HDCP Extension Cable," by Opticis, dated Aug. 27, 2003.

Caruso, Jeff; Bandwidth Boom: Making The Connection, Can Fiber Break Through The Glass Ceiling? [online] Jul. 13, 1998 [retrieved on Apr. 25, 2005]. Retrieved from the Internet: URL: http://www.internetweek.com/supp/bandwidth/canfiber.htm.

Opticis; Optical DVI Extension Module [online] [retrieved on Apr. 25, 2005]. Retrieved from the Internet: URL: http://www.opticis.com/product_2.htm.

Kanellos, Michael; Intel Gets Optical With Fibre [online] Mar. 1, 2004 [retrieved on Apr. 26, 2005]. Retrieved from the Internet: URL: http://news.zdnet.co.uk/0,39020330,39147918,00.htm.

Kanellos, Michael; Intel Connects Chips With Optical Fiber [online] Feb. 27, 2004 [retrieved on Apr. 26, 2005]. Retrieved from the Internet: URL: http://news.zdnet.com/2100-9584_22-5166883.html.

*Digital Visual Interface DVI Revision 1.0*, Digital Display Working Group. Apr. 2, 1999.

*High-Definition Multimedia Interface Specification Version 1.1*, HDMI Licensing, LLC. May 20, 2004.

*High-Definition Multimedia Interface Specification Version 1.2*, HDMI Licensing, LLC. Aug. 22, 2005.

*"Full-Scale Entry Of Optical Transmission System Business Begins As Fujifilm Introduces Optical Dvi Link System That Utilizes Lumistar, A Graded Index Plastic Optical Fiber—Realizes World's First 30m-Class High-Speed Optical Linking Of Digital Images Using A Plastic Optical Fiber"*; Sep. 8, 2004, (Web Page; 3 pages). http://www.fujifilm.com/news/n040908.html.

U.S. Appl. No. 11/402,186; Filed: Apr. 10, 2006; Active Optical Cable Electrical Connector; Lewis B. Aronson et al. (Workman Nydegger).

U.S. Appl. No. 11/402,106; Filed: Apr. 10, 2006; Active Optical Cable Electrical Connector; Lewis B. Aronson et al. (Workman Nydegger).

U.S. Appl. No. 11/402,241; Filed: Apr. 10, 2006; Active Optical Cable Electrical Connector; Lewis B. Aronson et al. (Workman Nydegger).

U.S. Appl. No. 11/402,161; Filed: Apr. 10, 2006; Active Optical Cable Electrical Connector; Lewis B. Aronson et al. (Workman Nydegger).

U.S. Appl. No. 11/401,802; Filed: Apr. 10, 2006; Active Optical Cable Electrical Connector; Lewis B. Aronson et al. (Workman Nydegger).

U.S. Appl. No. 11/402,169; Filed: Apr. 10, 2006; Active Optical Cable Electrical Connector; Lewis B. Aronson et al. (Workman Nydegger).

U.S. Appl. No. 11/401,803; Filed: Apr. 10, 2006; Active Optical Cable Electrical Connector; Lewis B. Aronson et al. (Workman Nydegger).

U.S. Appl. No. 11/468,280; Filed: Aug. 28, 2006; Active Optical Cable Electrical Connector; Lewis B. Aronson et al. (Workman Nydegger).

U.S. Appl. No. 11/470,623; Filed: Sep. 6, 2006; Active Optical Cable Electrical Connector; Lewis B. Aronson et al. (Workman Nydegger).

Inova Semiconductors, Application Note, GigaStar Digital Display Link, Interfacing Between GigaSTaR DDL and DVI/LVDS, Revision 1.0, 10 pages, May 2004.

* cited by examiner

OPTICAL CONNECTORS FOR ELECTRONIC DEVICES

CROSS REFERENCE TO RELATED APPLICATIONS

This application claims the benefit of U.S. Provisional Patent Application No. 60/529,129, filed Dec. 12, 2003, entitled "Systems and Devices for an Optical Home Network", and U.S. Provisional Patent Application No. 60/634,214, filed on Dec. 8, 2004, entitled "Optical Connectors and Cables for Home Electronics". All of the aforementioned applications are incorporated herein in their respective entireties by this reference.

BACKGROUND OF THE INVENTION

1. The Field of the Invention

The present invention relates generally to digital connectors, such as may be used between audio or video components of a home entertainment system, as well as between components in a personal computing system.

2. Background and Relevant Art

Present consumer electronics are designed to store, process, and playback increasingly larger amounts of data. One reason for this is a present trend toward broadcasting, storing, and playing back digital audio and video signals. In particular, digital audio and video broadcasts are becoming more and more popular since they typically provide stark improvements in audio and visual clarity, compared with prior analog signals. Nevertheless, although digital signals were initially smaller than conventional analog signals, present technology now uses digital signals that hold greater and greater amounts of information, such that digital signals are now becoming quite large.

To accommodate the trend in digital data, conventional storage and playback devices have increasingly improved. For example, some present storage devices now include digital video discs ("DVD") and high definition digital video discs ("HDDVD"), which are capable of storing several gigabytes or more of digital data. Other conventional storage devices include large hard drives that are implemented in a digital audio and/or video receiver, and which can store tens and hundreds of gigabytes of digital data. Conventional playback devices, such as for example, a digital audio receiver, or a digital television, such as a liquid crystal display ("LCD"), a plasma screen, and so forth, are also now also configured to process and playback the ever-expanding amounts of digital data.

Notwithstanding the improvements that digital-based storage and playback devices present over prior analog-based devices, conventional data transfer apparatus that link the broadcasting device or storage device to the playback device have reached their data carrying capacity in many cases. For example, common transfer speeds on conventional metal wiring ranges from 28 kilobits per second (kbps) to a few hundred megabits per second (mbps), and, in some cases, a few gigabits per second (gbps), depending on the transmission or reception protocol. A single digital video and audio signal sent to a digital television, however, might need to be transferred at a rate of several gigabits per second to be received and viewed properly. This can overwhelm a data transfer apparatus that may be used to carry multiple digital video and audio signals at once.

One reason that conventional data transfer apparatus are already close to their limits in terms of their abilities to transfer digital data is because conventional data transfer apparatus rely primarily on metal wiring. In particular, conventional metal wiring has a theoretical throughput limit of approximately 10 gbps to 20 gbps, which is near present data transfer needs—as many as 10 gbps in some cases. The reasons for these limits with metal wiring are based on a number of factors, such as signal attenuation, resistance, impedance, and so forth. In practice, however, most conventional metal connectors associated data transfer protocols are compatible with transfer rates of only a few gigabits per second, if that much. For example, conventional twisted-pair copper wiring has an approximate carrying capacity of about 1 gigabit per second. Coaxial cables, used to transmit television signals, also have similar throughput capacity, or possibly slightly more.

Accordingly, conventional cabling between electronic devices is becoming a limiting factor, despite the ever-improving storage and playback capabilities of the connected electronic devices. As a result, apparatus for transferring digital signals, particularly "High Definition" ("HD") digital signals from one component to the next have also changed. In particular, the Digital Video Interface ("DVI"), High Definition Multimedia Interface ("HDMI"), and Universal Serial Bus ("USB") interfaces and cables have been developed to more effectively transfer large volumes of digital data from one component to the next at a satisfactory throughput rate.

Unfortunately, DVI and HDMI cables also tend to be very expensive, are based on metal wiring, and are rather large and bulky, particularly if used for distances of more than a few feet. This can become a complication if a home user desires to wire one HD component in one room of a home to another room of a home. In particular, DVI and HDMI cables cannot be easily routed in a home at least in part since they have a stringent bend radius, and have other similar requirements that can complicate installation. Furthermore, the metallic composition of conventional DVI, HDMI, or even USB cables makes the cables susceptible to resistance, signal interference, and signal degradation, particularly over longer distances. As a result, despite the improved capabilities of present digital storage or playback devices, even DVI, HDMI, and USB connectors could limit the extent to which large digital data can be effectively transferred, and thus used.

As the demand for enhanced data transfer functionality has grown, attention has turned to various ways to circumvent metallic wiring between electrical components. For example, some wireless transfer protocols, such as the Blue Tooth protocol, Infrared Data Association ("IRDA") protocols, HomeRF systems, and Wireless Ethernet Compatibility Alliance ("WECA") protocols allow data to be transferred between components without using metallic wires for most of the distance.

Unfortunately, these types of systems still present various problems and shortcomings that may render them less than ideal for high throughput digital transfers. For example, infrared wireless networks depend on line-of-sight devices, and thus are not well suited for connecting devices that are located in different rooms, without strategic positioning of certain access points. In addition, HomeRF systems are characterized typically by relatively slow data rates, (about 1 mbps), have fairly limited range (about 75 to 125 feet), and can be difficult to integrate together within existing wired networks. Even still, the maximum data transfer speeds for other conventional wireless Ethernet networks is in the range of tens of megabits per second, rather than the gigabits per second necessary to transfer large digital content at an appropriate speed.

One way of circumventing some of the foregoing problems could be to substitute the copper wire in many of these conventional connector cables with optical fiber. In particular, a single mode optical fiber can carry approximately 20 terrabits per second (tbps), assuming a conventional 12.5 THz bandwidth, and a signal-to-noise value of about 20 decibels. This is a few orders of magnitude, and several thousand times the capacity of conventional copper wire. Unfortunately, the difficulty associated with precisely aligning optical fibers, and the lenses used within a relevant transmitter or receiver optical assembly, make conventional optical fibers less suitable for present consumer electronic applications. In particular, the manufacturing costs of aligning conventional optical components, such as an optical lens, at the appropriate fault tolerances between an optical fiber and a transmitter or receiver component would render conventional optical cables far too expensive for most consumer use.

In view of the foregoing, an advantage in the art could be realized with reliable, inexpensive connectors between home electronics components, which overcome the foregoing, and other, problems in the art. Ideally, such connectors should support high throughput speeds, while avoiding the signal interference and degadation inherent in transferring large digital files on copper wiring, and should be competitively priced.

BRIEF SUMMARY OF EXEMPLARY EMBODIMENTS OF THE INVENTION

The present invention addresses one or more of the foregoing, and other, problems in the art by replacing much of the metallic wiring in conventional digital data transfer connectors with optical fiber. In particular, exemplary embodiments of the present invention include optical cables having an optical transceiver embedded within the electrical connection interface, such as a USB, HDMI, or DVI without using a lens between the optical fiber and optical transceiver components.

For example, in accordance with one implementation of the present invention, an electrical connector interface, such as a USB, HDMI, or DVI connection interface includes a built-in optical transceiver having a Transmit Optical Sub-Assembly ("TOSA") positioned therein. The TOSA includes a Vertical Cavity Surface Emitting Laser ("VCSEL"), and a multi-mode optical fiber positioned relatively close to the VCSEL. The VCSEL is positioned to have a numerical aperture less than that of the corresponding optical transmit fiber. As such, and due in part to the relatively close distance between the VCSEL and the multi-mode fiber, a certain amount of fault tolerance is provided between the VCSEL and the fiber, allowing a manufacturer to avoid use of a lens.

In addition, the optical transceiver of the electrical connector interface also includes a Receive Optical Sub-Assembly ("ROSA") positioned therein. The ROSA includes a detector that is at least as wide as the core diameter of the optical fiber, and an optical receive fiber positioned relatively close to the ROSA. As such, a certain amount of fault tolerance is provided between the detector and the fiber. This allows the manufacturer to align the optical fiber without the use of a lens, as in the case of the TOSA portion of the electrical connection interface. The TOSA and ROSA are then electrically connected to the corresponding connection interface.

Since the manufacturer can substitute electrical wiring with optical wiring, the throughput speed of the cable is no longer a limiting factor when transferring large digital data from one component device to the next. In particular, the optical fiber avoids many of the disadvantages commonly known with metal wiring, such as limited throughput speed, resistance, impedance, EMI, and so forth. Furthermore, since the connector can be made without the use of a lens, a large part of the manufacturing costs typically associated with optical connectors can be avoided, making optical cables for use with conventional home electronic devices competitively priced.

These and other aspects of the present invention will become more fully apparent from the following description and appended claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF EXEMPLARY EMBODIMENTS

The present invention extends to replacing much of the metallic wiring in conventional digital data transfer connectors with optical fiber. In particular, exemplary embodiments of the present invention include optical cables having an optical transceiver embedded within the electrical connection interface, such as a USB, HDMI, or DVI without using a lens between the optical fiber and optical transceiver components.

As shown in FIGS. 1 through 4, an electrical connection interface includes a high-speed (i.e., gbps) multimode optical cable with an optical transceiver terminal, which may be configured for single or duplex optical fiber connections. More generally, the transceiver/connection interface takes the form of an electrical connection at one end, and an optical fiber connection, for "transmit" and "receive" fibers, at the other end. One useful aspect of this transceiver/electrical connection interface arrangement is that the transceiver is readily adaptable to existing electrical connection interfaces, as well as to electrical connection interfaces that are currently under development, or that may be developed in the future. Accordingly, although one type of electrical connection interface is shown, it will be appreciated that any number of types of electrical connection interfaces can be readily adapted for optical cables in accordance with the present invention, including USB, DVI, HDMI, IEEE 1394 (i.e., "Firewire"), and Ethernet connection interfaces.

Figure 1:
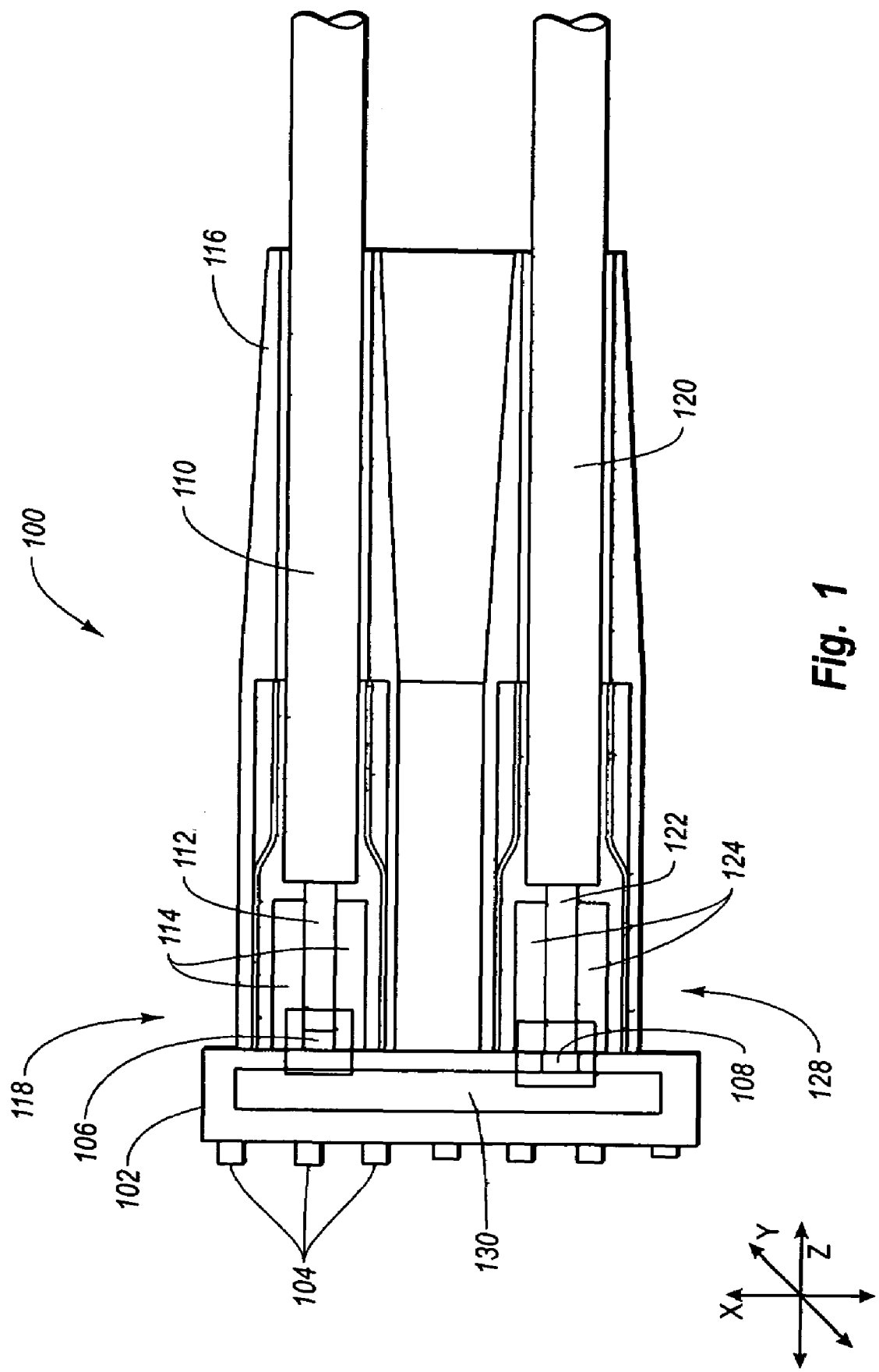
FIG. 1 illustrates a top view of an optical transceiver connected to an electrical connection interface, such as a DVI or HDMI connection interface, in accordance with an implementation of the present invention.

With more particular reference to the electrical/fiber pigtail implementation of the transceiver/electrical connection interface referred to above, an exemplary implementation of the transceiver/electrical connection interface includes a plurality of electrical connection points on one end of the transceiver/electrical connection interface. Generally, the connection point configuration and arrangement can be selected for compatibility with a particular desired system, device, or transmission medium. As shown in FIGS. 1 though 4, the connection points enable transmission of electrical data signals to the optical transceiver, and receipt of electrical data signals from the optical transceiver.

For example, FIG. 1 illustrates an electrical connector 100, such as a connector using a DVI or HDMI connection interface that is coupled with an optical transceiver. In particular, FIG. 1 shows that the electrical connector 100 includes an electrical connection interface 102 having one or more electrical connector points 104 extending, or mounted thereon. One will appreciate that any number, type, configuration and/or orientation of electrical connector points 104 can be used in accordance with the present invention, and may be based on the application or device interface. In particular, the type, configuration, number, and orientation of connector points 104 can vary with the number and/or orientation of the relevant electrical connection interface, which in turn is configured to mate with the corresponding consumer device interface on the consumer device. FIG. 1 also shows that the connection interface 102 also comprises a substrate 130, upon which is mounted an optical transceiver, including an optical transmitter 106 and an optical detector 108.

The optical transmitter 106 forms part of a Transmit Optical Sub-Assembly ("TOSA") 118, which is in communication with an optical transmit fiber 110. In some implementations, the TOSA 118 also includes a fiber guiding ring 114, which is configured to receive an optical transmit fiber 110, and to guide the corresponding transmit optical fiber core 112 into position. The optical detector 108 forms part of a Receive Optical Sub-Assembly ("ROSA") 128, which is in communication with an optical receive fiber 120. As with the TOSA 118, the ROSA 128 can also include a fiber guiding ring 124, which is configured to receive the optical receive fiber 120, and to guide the corresponding optical fiber core 122 into position.

In general, the substrate 130 comprises a Printed Circuit Board ("PCB"), such as one made of conventional materials, and can also include additional Silicon substrates that are surface mounted on the PCB. As such, one will appreciate that the substrate 130 can also include (such as by etching, or other form factor processes) the appropriate electronic circuitry for driving the optical transmitter 106 and the optical detector 108, as well as for directing the electrical signals to the appropriate electrical connector points 104. For example, the substrate 130 can include a laser driver (not shown) for receiving electrical signals from a corresponding electronic device, and sending the electronic signals to the laser, to the optical transmitter 106 to be converted into a corresponding optical signal.

By way of explanation, although frequent reference is made herein to substrate 130, one will appreciate that there can be multiple PCBs inserted within the electrical connection interface 102, upon which are mounted various components. For example, in one implementation, the substrate 130 comprises mounting and connections only for the TOSA 118 and the ROSA 128. The remaining active and/or passive circuitry components relevant to interacting and transferring signals at the device interface level may be mounted on an opposite side of the substrate 130, or on a separate electrical connection circuit substrate (not shown) altogether. Accordingly, only one PCB is shown in the Figures, and general reference is made only to the "transceiver substrate" for purposes of convenience.

In any event, the substrate 130 (and other PCBs as appropriate) shown in FIG. 1 can include other components that are useful in driving, monitoring, and/or controlling the optical transmitter 106, such as one or more memory or storage components, a Monitor Photo-Diode ("MPD"), and any other active or passive circuitry components, as needed. Still further, the substrate 130 can also include components associated, or interacting, with the operation of the optical detector 108. As such, the substrate 130 can also include any a photodiode ("PD"), such as an Avalanche Photodiode ("APD"), as well as a post-amplifier ("postamp"), and/or a Trans-Impedance Amplifier ("TIA").

These, and other transceiver components that can be mounted on the substrate 130 for use with the optical transmitter 106 and optical detector 108, are also described in commonly-assigned U.S. patent application Ser. No. 10/828,724, filed on Apr. 21, 2004, entitled "Integrated Optical Assembly", the entire contents of which are incorporated herein by reference. In addition, U.S. patent application Ser. No. 10/829,742, filed on Apr. 22, 2004, entitled "Optical Transceiver with Integrated Feedback Device"; U.S. patent application Ser. No. 10/829,608, filed on Apr. 22, 2004, entitled "Compact Optical Transceivers for Host Bus Adaptors"; and U.S. patent application Ser. No. 10/829,609, filed on Apr. 22, 2004, entitled "Compact Optical Transceivers" each describe component configurations for driving and operating an optical transmitter and optical detector in relatively tight arrangements; and accordingly, the entire specifications of which are also incorporated herein by reference.

Referring again to FIG. 1, the optical transmitter 106 generally comprises a Vertical Cavity Surface-Emitting Laser ("VCSEL"), although another application-appropriate optical signal generator, such as a Light Emitting Diode ("LED") may be appropriate in some cases. The optical transmitter 106 is in turn mounted in close proximity to the transmit fiber core 112.

As shown, the optical transmitter 106 sends optical signals "in direct optical communication" to the transmit fiber core 112, that is without an interfacing lens positioned therebetween. For the purposes of this specification and claims, the phrase "in direct optical communication" refers to passing signals between an optical fiber and an optical transmitter or optical receiver without the use of a lens, or without a lens positioned between the optical transmitter or optical receiver and the corresponding optical fiber core. Accordingly, the transmit fiber core 112 also receives optical signals "in direct optical communication" from the optical transmitter 106, or without an interfacing lens positioned therebetween. This is possible when the optical transmitter 106 is positioned close enough so that the "numerical aperture" of the optical transmitter 106 is less than that of transmit fiber core 112.

In multimode fibers, the numerical aperture generally refers to the "light-gathering ability" of the optical fiber in the case of a transmitter 106, and defines the angular extent of light output in the case of an optical detector 108, which is used as a collector. In transmitter optics, the transmit fiber core 112 only gathers light that is within the cone angle defined by optical fiber core 112 numerical aperture. On the receive side, the optical detector 108 only gathers light that is incident on its active area within the fiber output cone angle. The fiber output cone angle is defined by the receive optical fiber's 120 numerical aperture, and the distance of the optical detector 108 from the output facet of the optical fiber core 122. Without the use of a lens, transmission between a source component and a receiving component (i.e., optical transmit fiber 110 in the case of transmission) is best accomplished when the numerical aperture of the receiving component is greater than the numerical aperture of the source component.

In particular, if the optical fiber core 112 in an approximately 62.5 micron core multi-mode fiber has a numerical aperture of approximately 0.275, the optical transmitter 106 should have a correspondingly lower numerical aperture value of <0.275, and should be positioned relatively close (e.g., about 10 microns or less) to the optical fiber core 112 to maximize this effect. (With an about 50 micron fiber core, the numerical aperture of the optical transmit fiber is about 0.2). This arrangement thereby helps ensure the "light-gathering ability" of the fiber core 112 sufficiently without the use of a lens.

The optical detector 108 accomplishes an analogous objective with respect to the optical transmitter 106 and the transmit fiber 110. In particular, the optical detector 108 can be implemented "in direct optical communication" with the optical receive fiber 120, or without the use of an interfacing lens positioned between the optical receiver 108 the optical fiber 120. This is possible when the optical detector 108 is simply larger in diameter than the receive fiber core 122. In particular, with a conventional optical fiber core 128 of about 62.5 microns in diameter, the optical detector 108 need only be larger than 62.5, with a few microns of diameter added to enable an amount of alignment fault tolerance.

Nevertheless, since the size of the receiving component 108 can affect the transmission throughput speed of the transceiver, a balance will be understood for different applications. For example, assuming a fiber core diameter of 62.5 microns, an optical detector of about 120 microns may be suitable for, or compatible with, 2.0 gbps applications, while an optical detector sized at about 70 microns may be suitable for, or compatible with, 10.0 gbps applications. As with the transmitter 106, the optical receive fiber core 122 is positioned relatively close, or within about 10 microns or less, to maximize the "light-gathering" effect of the detector 108.

Figure 2:
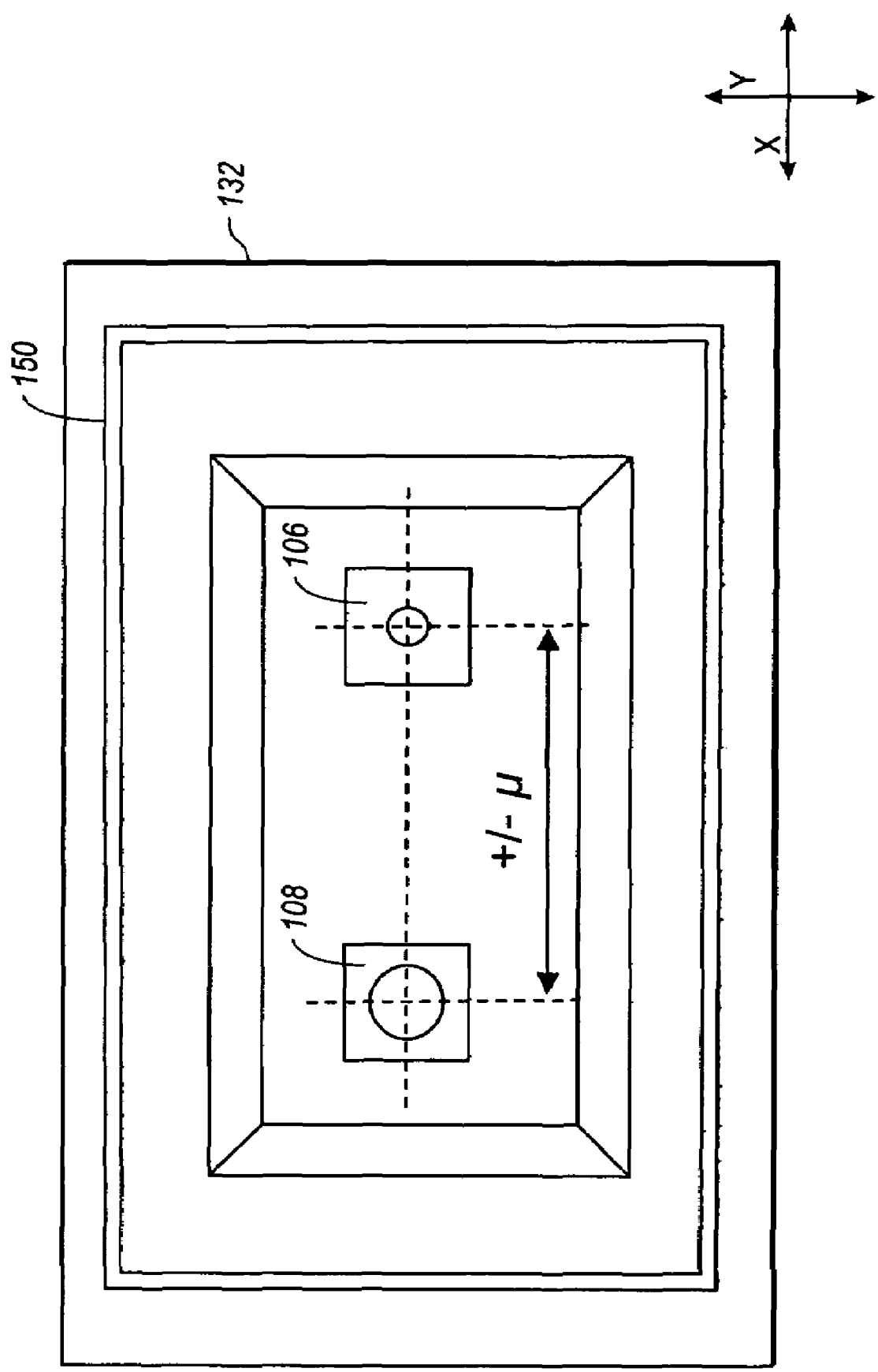
FIG. 2 illustrates a top view of an optical substrate for use with the electrical connection interface shown in FIG. 1.

FIG. 2 illustrates a close up view of a transceiver substrate 132, which is coupled to, or forms part of, substrate 130. In particular, FIG. 2 illustrates an exemplary position for the optical send and receive components. FIG. 2 also illustrates a metal solder 150, which runs about the periphery of the transceiver substrate 132. As illustrated, the optical transmitter 106 and the optical detector 108 each have center points that are positioned on a common Y coordinate, and therefore aligned on the X plane.

FIG. 2 also shows that the optical transmitter 106 is somewhat smaller in diameter, by a measure of microns, than the optical detector 108. These size differentials, and the respective numerical aperture of the source, are needed to maximize transmission/reception efficiency with respect to the corresponding transmit fiber core 112, or the receive fiber core 122, when aligned without a lens. As can be appreciated, therefore, the size of the optical transmitter 106 and the optical detector 108, relative to the corresponding core fibers 112, 122, as well as the NA of the source and fibers, allow an amount of alignment fault tolerance.

The fault tolerance for alignment with the given optical fiber to the optical transmitter 106 can be plus or minus 5 microns, where the numerical aperture of the optical transmitter 106 is less than half the optical transmit fiber core 112 size. This is the case, in particular, with an output numerical aperture that is easily contained within the numerical aperture of the optical transmit fiber 110, and when the optical transmitter 106 output is in close proximity (about 10 microns or less) to the optical fiber core 112 facet. In the case of the optical detector 108, this alignment fault tolerance could be plus or minus about 10 microns, where the active area diameter of the optical detector 108 is about 20 microns larger than the optical receive fiber core 122 diameter, and where the fiber facet of the optical receive fiber 120 is in close proximity to the active area of the optical detector 108. Alignment within this fault tolerance is easily accomplished using conventional optical manufacturing techniques.

Figure 3:
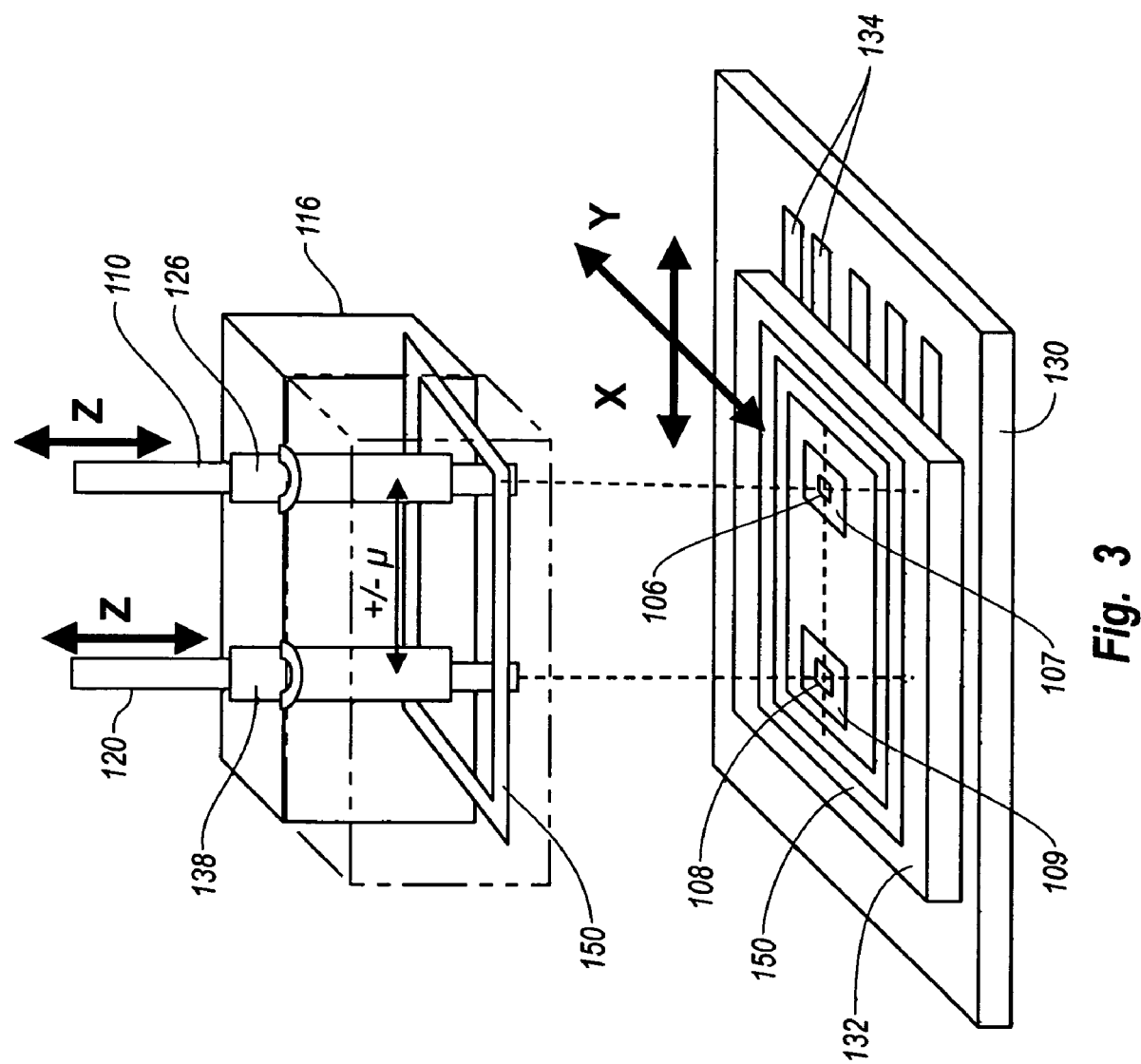
FIG. 3 illustrates a perspective view of an assembly of the electrical connection interface, optical substrate, and optical fibers as they are aligned to the optical substrate in accordance with an implementation of the present invention.

FIG. 3 illustrates a basic assembly view of transmit and receiver optical fibers relative to the substrate 132. For example, in one implementation, the transmit fiber 110 and receive fiber 120 are aligned within corresponding metal jackets 126 and 138 of a fiber block 116. In general, the metal jackets 126 and 138 are soldered or welded to the fiber block 116. The fiber block 116 can be composed of any number of materials, although glass is suitable for one or more implementations. FIG. 3 also shows that the optical transmitter 106 and the optical detector 108 are positioned within corresponding optical sub-mounts 107 and 109. In general, the optical sub-mounts can comprise any conventional sub-mount material such as silicon, ceramic, or plastic.

One exemplary configuration of the fiber block 116 and metal jackets 126, 138 provides plus or minus about 5 microns fault tolerance between the corresponding fiber cores and the X/Y positions of the optical transmitter 106 and optical detector 108 on the transceiver substrate 132. As shown, the fiber block 116 is then positioned over the transceiver substrate 132 so that corresponding metal solder lines 150 on the fiber block 116 and on the transceiver substrate 132 are aligned. When the fiber block 116 is positioned appropriately (X/Y aligned), the corresponding optical transmit fiber 110 is positioned directly over the optical transmitter 106, and the optical detector fiber 120 is positioned directly over the optical detector 108, within about 1 micron of error in some cases.

The transmit fiber 110 and the receive fiber 120 are then Z aligned, or aligned to the appropriate proximity to the corresponding optical transmitter 106 or optical detector 108. As disclosed herein, this proximity is in some cases within about 10 microns. The end of the transmit fibers 110 and the receive fiber 120 are then epoxy-filled with the corresponding sub-mounts 107 and 109, so that there is no air gap transition between the optical fiber cores and the corresponding transmitter 106 or receiver 108. The epoxy can be any suitable, refraction-index matched epoxy, such as one having an index of refraction greater than 1.5 (greater than air). The fiber block 116 is then soldered to the transceiver substrate 132.

Having an optical epoxy filled between the fiber-facet and the optical transmitter or optical detector surfaces also limits the amount of reflection back into the relevant optical fiber, as well as any feedback into the optical transmitter or optical receive fiber from the close proximity fiber surface. This allows the optical transmitter 106 and the optical detector 108 to work without any additional penalty that may be caused due to reflections in the transmission systems and/or due to any laser feedback that could limit the transmission speed of the system.

The assembly depicted in FIG. 3 can be done using any number of conventional wafer scale assembly processes. Furthermore, the assembly can be done automatically with any passive or active alignment techniques. The assembly can also include adding an attenuation coating at the end of the transmit fiber 110, in order to match the optical transmitter 106 output for a constant power setting. As well, a power tap on the transmit fiber 110 can be included to monitor output power.

Figure 4:
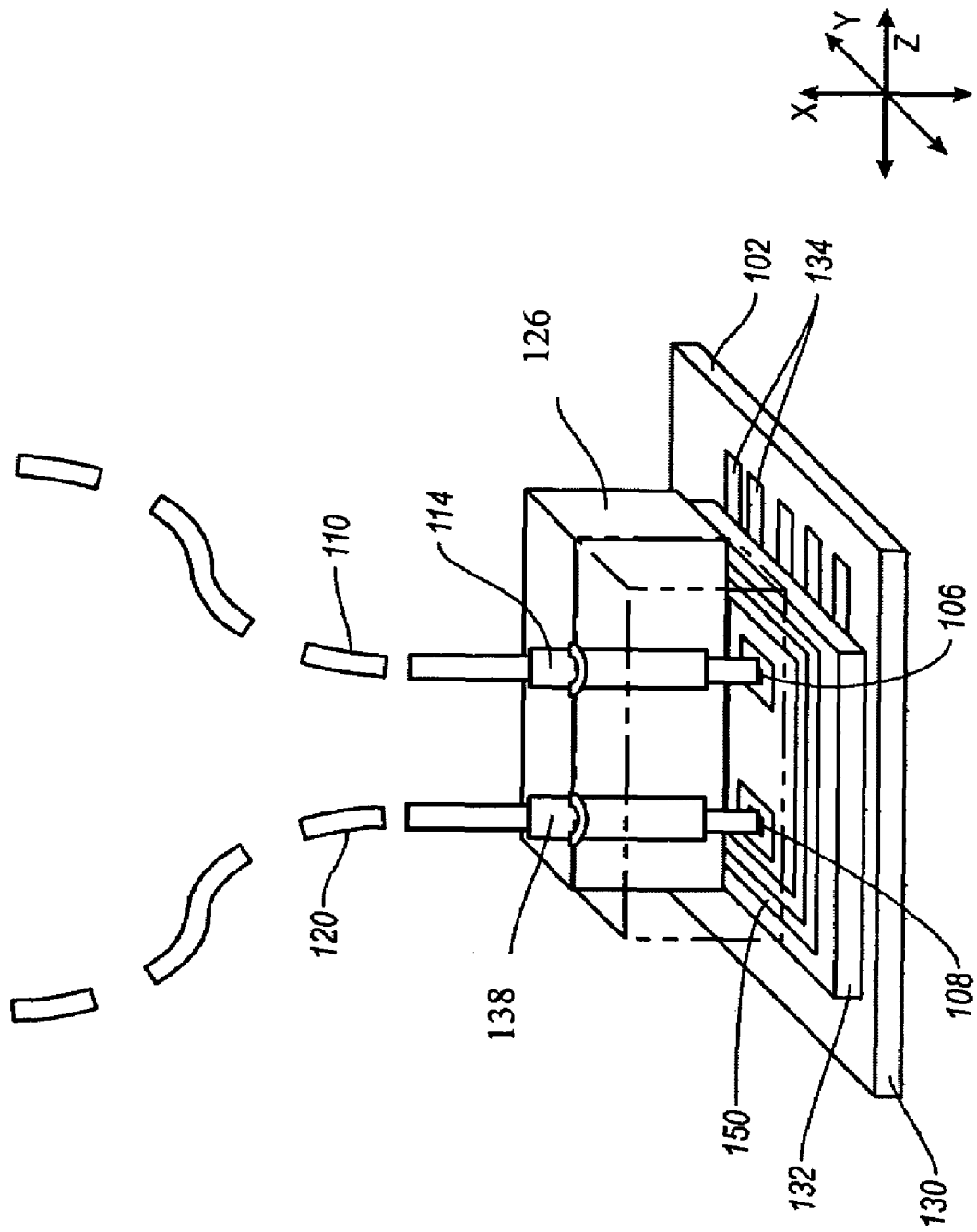
FIG. 4 illustrates a perspective view of the components depicted in FIG. 3 after the components have been assembled in accordance with an implementation of the present invention.

FIG. 4 illustrates a composite view of the components in FIG. 3 after assembly. As shown, the optical transmit fiber 110 and receive fiber 120 extend from the fiber block 116, and electrical connectors 134 extend perpendicularly to the fibers on the substrate 130. In operation, the transmit and receive fibers send and receive optical data signals, which are either generated or processed at the components identified herein on the transceiver substrate 132. The electrical connectors 134 then transmit and receive electrical signals from the optical source and receiving components to corresponding electrical connector points 104, or generally to the substrate 130.

In one implementation of the invention, the transmit fiber 110 and the receive fiber 120 in FIG. 4 can comprise any of an SC connector, an LC connector, a fiber optic pigtail, or the like. In some cases, the type of connector or fiber may be application-specific, device interface-specific, and even transmission protocol specific. The transceiver/electrical connection interface, as described herein can therefore operate as a shortwave transceiver, having effective data rates of about 10 gbps or more.

In view of the foregoing, optical/electrical connection interfaces are relatively easy to install and use and, accordingly, are well suited for use with consumer electronics that may be installed and/or used by persons not well acquainted with such installations. Moreover, the optical/electrical connection interface enables high-speed data transmission, such as may be used in environments where large amounts of digital content must be rapidly transferred between systems, devices and applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. An HDMI connector cable configured to communicate digital content between two electronic devices using optical multimode fibers comprising:
    an electrical connection interface configured for an HDMI connection; and
    an optical transceiver that is communicably coupled with the HDMI electrical connection interface, the optical transceiver having an optical transmitter in direct optical communication with an optical transmit fiber, and an optical detector in direct optical communication with an optical receive fiber.

2. The connector cable as recited in claim 1, wherein the optical transmitter is a VCSEL.

3. The connector cable as recited in claim 1, wherein the optical detector includes a PN photodiode, a PIN photodiode, or an avalanche photodiode.

4. The connector cable as recited in claim 1, wherein a core of the optical transmit fiber is separated from the optical transmitter by an epoxy, wherein the epoxy is an index-matched epoxy.

5. The cable as recited in claim 4, wherein the optical transmitter and the optical detector are each mounted to a corresponding transmit or receive sub-mount on the transceiver, and wherein the optical transmit fiber and the optical receive fiber are adhered by the index-matched epoxy to the corresponding transmit or receive sub-mount.

6. The connector cable as recited in claim 1, wherein the optical transmit fiber and the optical detector fiber are each aligned within about 10 microns from the corresponding optical transmitter and the optical detector.

7. The connector cable as recited in claim 1, wherein an alignment fault tolerance between the optical transmit fiber and the optical transmitter is plus or minus 5 micron.

8. The connector cable as recited in claim 1, wherein the alignment of the optical transmit fiber to the optical transmitter and alignment of the optical detector to the optical receive fiber is performed in a single alignment act.

9. The connector cable as recited in claim 1, wherein the optical transmit fiber and the optical receive fiber are both held by a fiber block.

10. The connector cable as recited in claim 1, wherein an active area diameter of the optical detector is about 20 microns larger than a core diameter of the optical receive fiber.

11. The connector cable as recited in claim 1, wherein the optical transmit fiber has a numerical aperture value that is greater than the numerical aperture value of the optical transmitter.

12. The connector cable as recited in claim 11, wherein the numerical aperture value of the optical transmit fiber is about 0.275.

13. The connector cable as recited in claim 11, wherein the numerical aperture value of the optical transmit fiber is about 0.2.

14. The connector cable as recited in claim 1, wherein the optical receive fiber has an optical fiber core size that is smaller than an active area of the optical detector.

15. The connector cable as recited in claim 14, wherein the receive fiber core has a diameter of about 62.5 microns, and wherein the diameter of the optical detector is at least about 62.5 microns.

16. The connector cable as recited in claim 14, wherein the receive fiber core has a diameter of about 50 microns, and wherein the diameter of the optical detector is at least about 50 microns.

17. The connector cable as recited in claim 1, wherein the optical detector is compatible with data rates of about 2.0 gbps or about 10.0 gbps.

18. The connector cable as recited in claim 1, wherein the optical transceiver includes a transmit guiding ring secured about the optical transmitter, and a receive guiding ring secured about the optical receiver.

19. The connector cable as recited in claim 1, further comprising a fiber block mounted to the optical transmitter and the optical detector, the fiber block including the optical transmit fiber and an optical receiver fiber aligned therein, such that no air gap transition exists between a core of the optical transmit or receive fiber and the corresponding optical transmitter or optical detector.

20. The connector cable as recited in claim 19, wherein the fiber block further comprises a plurality of jackets welded therein, the plurality of jackets being configured to align the optical transmit fiber and the optical receive fiber within close proximity to the optical transmitter or the optical receiver.

21. The connector cable as recited in claim 1, wherein multiple electrical signals are converted into a single optical signal for transmission over the single optical transmit fiber.

22. The connector cable as recited in claim 1, further comprising a substrate including mounting connections, wherein active and/or passive circuitry components for transferring signals at the device level are mounted on a side of the substrate opposite to the side to which the mounting connections are mounted.

23. The connector cable as recited in claim 1, further comprising a component configured to control the optical transmitter.

24. The connector cable as recited in claim 23, further comprising memory coupled to the component configured to control the optical transmitter.

25. The connector cable as recited in claim 1, wherein the transmit fiber and the receive fiber include an SC connector, an LC connector, or a fiber optic pigtail.

26. The connector cable as recited in claim 1, wherein the optical receiver includes an integrated detector preamplifier.

* * * * *

UNITED STATES PATENT AND TRADEMARK OFFICE
CERTIFICATE OF CORRECTION

PATENT NO. : 7,347,632 B2  Page 1 of 2
APPLICATION NO. : 11/009208
DATED : March 25, 2008
INVENTOR(S) : Farr It is certified that error appears in the above-identified patent and that said Letters Patent is hereby corrected as shown below:

In the Drawings
Sheet 4, replace Figure 4 with the figure depicted below, wherein label 102 is removed, fiber block is relabeled 116, and metal jacket is relabeled 126

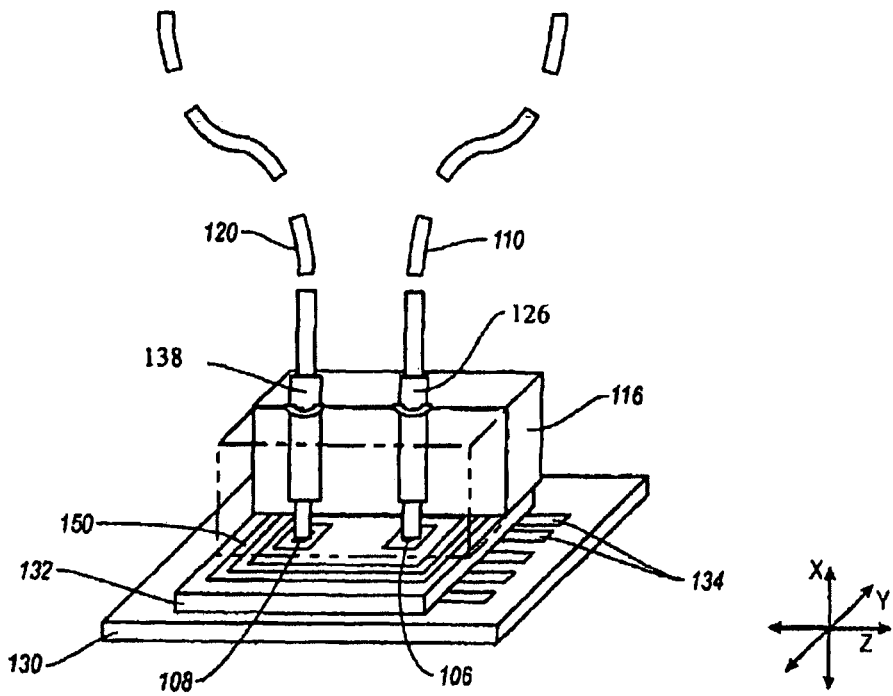

Fig. 4

Signed and Sealed this

Fourteenth Day of December, 2010

David J. Kappos
*Director of the United States Patent and Trademark Office*

In the Specifications:
Column 7
Line 49, after "130", add [(FIG. 1)]
Line 62, after "112", add [(FIG. 1)]
Line 63, after "122", add [(FIG. 1)]
Line 66, after "122", add [(FIG. 1)]

Column 8
Line 4, after "112", add [(FIG. 1)]
Line 7, after "110", add [(FIG. 1)]
Line 9, after "112", add [(FIG. 1)]
Line 13, after "122", add [(FIG. 1)]
Line 14, after "120", add [(FIG. 1)]

Column 9
Line 23, after "104", add [(FIG. 1)]